(12) United States Patent
Gard

(10) Patent No.: US 8,305,229 B1
(45) Date of Patent: *Nov. 6, 2012

(54) SYSTEM FOR WIRELESS COMMUNICATION ALONG A DRILL STRING

(75) Inventor: Michael F. Gard, Perry, OK (US)

(73) Assignee: The Charles Machine Works, Inc., Perry, OK (US)

( * ) Notice: Subject to any disclaimer, the term of this patent is extended or adjusted under 35 U.S.C. 154(b) by 395 days.

This patent is subject to a terminal disclaimer.

(21) Appl. No.: 12/689,148

(22) Filed: Jan. 18, 2010

Related U.S. Application Data

(63) Continuation of application No. 11/560,782, filed on Nov. 16, 2006, now Pat. No. 7,649,474.

(60) Provisional application No. 60/737,836, filed on Nov. 16, 2005.

(51) Int. Cl.
G01V 3/00 (2006.01)

(52) U.S. Cl. ............... 340/854.6; 340/854.4; 340/854.5; 340/854.7; 175/26; 175/45; 175/61; 175/203; 175/220

(58) Field of Classification Search .... 340/854.3–854.8; 175/26, 45, 61, 203, 220
See application file for complete search history.

(56) References Cited

U.S. PATENT DOCUMENTS

| | | |
|---|---|---|
| 2,379,800 A | 7/1945 | Hare |
| 3,150,321 A | 9/1964 | Summers |
| 3,906,435 A | 9/1975 | Lamel et al. |
| 3,945,704 A | 3/1976 | Kraus et al. |
| 4,072,200 A | 2/1978 | Morris et al. |
| 4,087,781 A | 5/1978 | Grossi et al. |
| 4,174,577 A * | 11/1979 | Lewis .............................. 33/302 |
| 4,496,174 A | 1/1985 | McDonald et al. |

(Continued)

FOREIGN PATENT DOCUMENTS

WO 0155554 A1 8/2001

(Continued)

OTHER PUBLICATIONS

S.R. Kramer, W.J. McDonald, and J.C. Thomson, "An Introduction To Trenchless Technology", New York: Van Nostrand Reinhold, pp. 172-175, 1992.

*Primary Examiner* — Timothy Edwards, Jr.
(74) *Attorney, Agent, or Firm* — Tomlinson Rust McKinstry Grable

(57) ABSTRACT

A wireless communication and drill string telemetry system. The communication system is used for communicating information along a drill string between a boring tool and a boring machine. An insulator assembly provides an electrically insulated gap between the drill string communication path and a soil engaging electrode for the electrical return path. A transmitter assembly includes a data transmitter for encoding and transmitting a data signal. A signal coupler couples the data signal to the drill string and provides a controlled electrical connection between the drill string communication path and the soil engaging electrode. The signal coupler comprises a transformer and a current regulating circuit to adjust a voltage across the transformer's primary winding. A receiver assembly is disposed proximate the drilling machine and includes a toroidal pickup coil and a signal processing assembly. The pickup coil has an annulus and is positioned such that the drill string communication path passes through the annulus. The pickup coil produces a signal voltage in response to a signal current on the drill string that the signal processing assembly processes to extract the data signal.

26 Claims, 5 Drawing Sheets

U.S. PATENT DOCUMENTS

| | | | |
|---|---|---|---|
| 4,525,715 A | 6/1985 | Smith | |
| 4,578,675 A | 3/1986 | MacLeod | |
| 4,628,275 A | 12/1986 | Skipper et al. | |
| 4,630,243 A | 12/1986 | MacLeod | |
| 4,648,672 A | 3/1987 | Kobler | |
| 4,691,203 A | 9/1987 | Rubin et al. | |
| 4,725,837 A | 2/1988 | Rubin | |
| 4,739,325 A | 4/1988 | Macleod | |
| 4,788,544 A | 11/1988 | Howard | |
| 4,800,385 A | 1/1989 | Yamazaki | |
| 4,839,644 A | 6/1989 | Serfinya et al. | |
| 4,873,488 A | 10/1989 | Barber | |
| 4,884,071 A | 11/1989 | Howard | |
| 4,933,640 A | 6/1990 | Kuckes | |
| 5,091,725 A | 2/1992 | Gard | |
| 5,264,795 A | 11/1993 | Rider | |
| 5,455,573 A | 10/1995 | Delatorre | |
| 5,467,083 A | 11/1995 | McDonald et al. | |
| 5,576,703 A | 11/1996 | MacLeod et al. | |
| 5,745,047 A | 4/1998 | Van Gisbergen et al. | |
| 5,818,352 A | 10/1998 | McClure | |
| 6,392,317 B1 | 5/2002 | Hall et al. | |
| 6,392,561 B1 | 5/2002 | Davies et al. | |
| 6,396,276 B1 | 5/2002 | Van Steenwyk et al. | |
| 7,649,474 B1 * | 1/2010 | Gard | 340/854.6 |
| 2004/0256159 A1 * | 12/2004 | Alft et al. | 175/61 |
| 2007/0247329 A1 | 10/2007 | Petrovic et al. | |

FOREIGN PATENT DOCUMENTS

| | | |
|---|---|---|
| WO | 0168718 A2 | 9/2001 |
| WO | 0201676 A1 | 2/2002 |
| WO | 02063341 A1 | 8/2002 |

* cited by examiner

SYSTEM FOR WIRELESS COMMUNICATION ALONG A DRILL STRING

CROSS REFERENCE TO RELATED APPLICATION

This application is a continuation of U.S. application Ser. No. 11/560,782 filed Nov. 16, 2006, which claims the benefit of U.S. Provisional Application No. 60/737,836 filed Nov. 16, 2005, the contents of which are incorporated herein by reference.

FIELD OF THE INVENTION

The present invention relates to the field of horizontal directional drilling and in particular to wireless communication of information along a drill string.

SUMMARY

The present invention is directed to a drill string communication system for communicating information along a drill string between a boring tool and a boring machine. The system comprises an insulator assembly, a transmitter assembly, and a receiver assembly. The insulator assembly is adapted to provide an electrically insulated gap between a drill string communication path and a soil engaging electrode. The transmitter assembly comprises a data transmitter assembly adapted to encode and transmit a data signal and a signal coupler. The signal coupler is adapted to provide a controlled electrical connection between the drill string communication path and the soil engaging electrode. The signal coupler comprises a transformer having a primary winding and a secondary winding, and a current regulating circuit adapted to adjust a voltage across the primary winding to maintain a substantially constant current amplitude in the primary winding. A first side of the secondary winding is connected to the drill string communication path and a second side of the secondary winding is connected to the soil engaging electrode. The receiver assembly comprises a toroidal pickup coil and a signal processing assembly. The pickup coil has an annulus and is positioned such that the drill string communication path passes through the annulus. The pickup coil is adapted to produce a signal voltage in response to a signal current on the drill string communication path. The signal processing assembly is adapted to process the signal voltage from the toroidal pickup coil and to extract the data signal.

In an alternative embodiment, the present invention is directed to a method for communicating information along a drill sting. The method comprises the steps of insulating a first end of a drill string from a second end of the drill string, generating an electromagnetic data signal, generating a current on the drill string using a transformer having at least one primary winding and at least one secondary winding, connecting a first side of the secondary winding to the first end of the drill string, connecting a second side of the secondary winding to the second end of the drill string, adjusting a voltage across the primary winding to maintain a substantially constant current amplitude in the primary winding, sensing the current on the first end of the drill string using a toroid positioned around the first end of the drill string, and processing the current sensed at the toroid to extract the data signal.

DETAILED DESCRIPTION OF THE DRAWINGS

Horizontal directional drilling (HDD) permits installation of utility services or other products underground in an essentially "trenchless" manner, minimizing surface disruption along the length of the project and reducing the likelihood of damaging previously buried products. A directional drilling operation involves use of an HDD machine to advance a boring tool attached to a drill string along a preplanned borepath through the earth. As the boring tool is advanced through the earth, information about the operation and location of the boring tool must be known in order to maintain the borepath. Generally, a tracking receiver is used on the surface of the ground to track the progress of the boring tool and receive information concerning the boring tool's operation. However, efficient communication of accurate information from the boring tool to an operator at the HDD machine remains a need in the industry, particularly where surface access is not possible, is inconvenient, or is dangerous. The invention of the present application is directed to wireless communication of information along the drill string between the boring tool and the machine.

Figure 1:
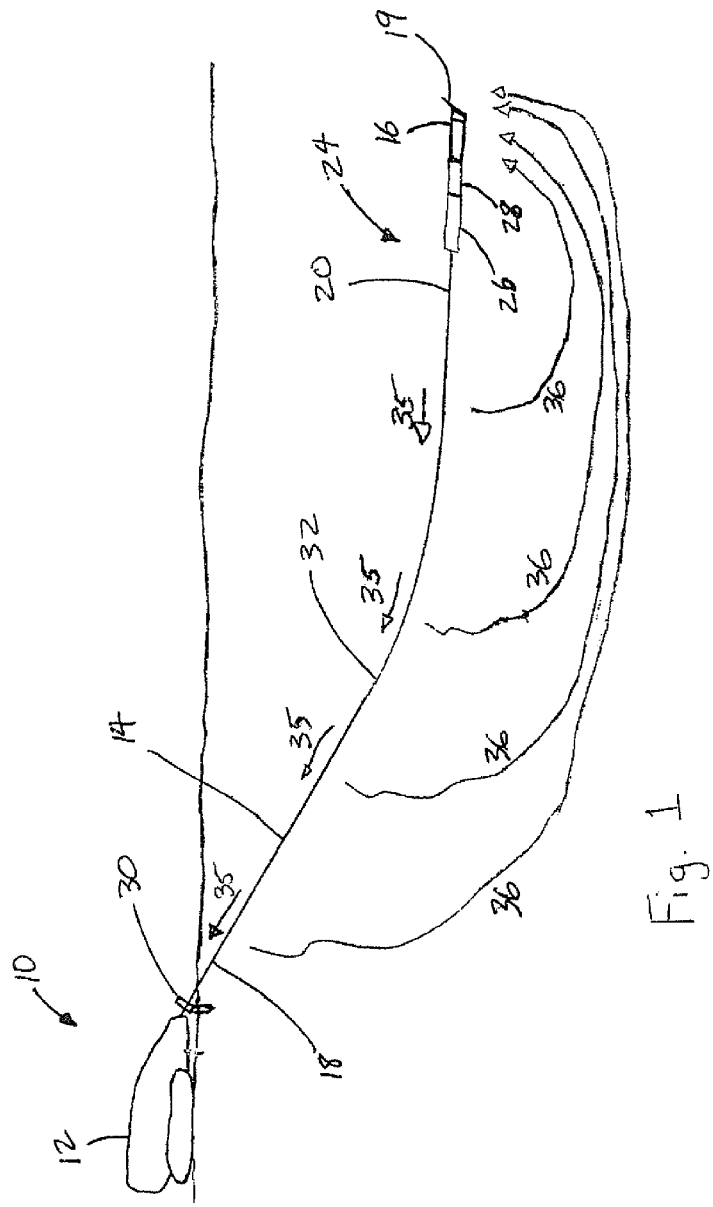
FIG. 1 is a side view of an HDD drilling operation having a drill string communication system built in accordance with the present invention.

With reference now to the drawings and to FIG. 1 in particular, shown therein is a HDD system 10 for use with the present invention. The HDD system 10 comprises a drilling machine 12, a drill string 14, and a downhole tool assembly 16. The drilling machine 12 is operatively connected to the drill string 14 at an uphole end 18 of the drill string. The downhole tool assembly 16 generally comprises a drill bit 19 and is operatively connected to a downhole end 20 of the drill string 14. The downhole tool assembly 16 may include any of a variety of tools and electronics suitable for use during an HDD operation. Typically, the drill string 14 is comprised of a series of interconnected pipe sections, or may be a continuous length of tubing. For purposes of the present invention, the drill string 14 may be any length of pipe or tubing providing an electrically conductive path.

The present invention comprises a communication system 24 for wireless communication, or drill string telemetry, along the drill string 14. The communication system 24 uses the drill string 14 as a data conductor and the soil of the earth to provide an electrical return path. This operating arrangement has the advantage of requiring no wireline to carry data and power. The present invention provides for the transfer of data from the downhole tool assembly 16 to the drilling machine 12 without requiring the intervention of a conventional tracking receiver and RF data link.

In the preferred embodiment, the communication system 24 comprises an insulator assembly 26, a transmitter assembly 28, and receiver assembly 30. The insulator assembly 26 provides an insulated gap for an electrical circuit created for the wireless communication. The transmitter assembly 28 is adapted to inject electrical current 32 onto the drill string 14. Because the drill string 14 is an electrical conductor, the signal current 32 propagates along a drill string communication path between the downhole tool assembly 16 and the drilling machine 12 in the direction of arrows 35 for arrows showing propagation up the drill string, while arrows 36 are used to illustrate the return signal path. Although there are signal losses to the soil, a portion of the drill string current 32 reaches the drilling machine 12 where it passes through the receiver assembly 30 and thence to ground 34. To prevent signal loss, one skilled in the art will appreciate that the drill string 14 may be coated with an insulating material to insulate the drill string from the soil. The soil of the ground 34 forms a return connection for the signal path as shown by the arrows 36, with the drill bit 19 on the downhole end 20 of the drill string 14 acting as a conductive soil engaging electrode. The present invention also anticipates an alternative embodiment in which the drill bit 19 may be comprised of a ceramic or other nonconductive material. In such a case, the downhole tool assembly 16 may further comprise a separate conductive structure to function as the soil engaging electrode.

To establish the intended communication circuit, the drill string communication path, the drill string 14, must be electrically insulated from the soil engaging electrode, the drill bit 19. The insulator assembly 26 is provided for this purpose and is connected between the downhole end 20 of the drill string 14 and the downhole tool assembly 16. Preferably, the insulator assembly 26 comprises a section of nonconductive material. More preferably, the insulator assembly 26 is comprised of a fiberglass or epoxy composite material. Alternatively, the insulator assembly 26 may be of ceramic or other nonconductive material.

Figure 2:
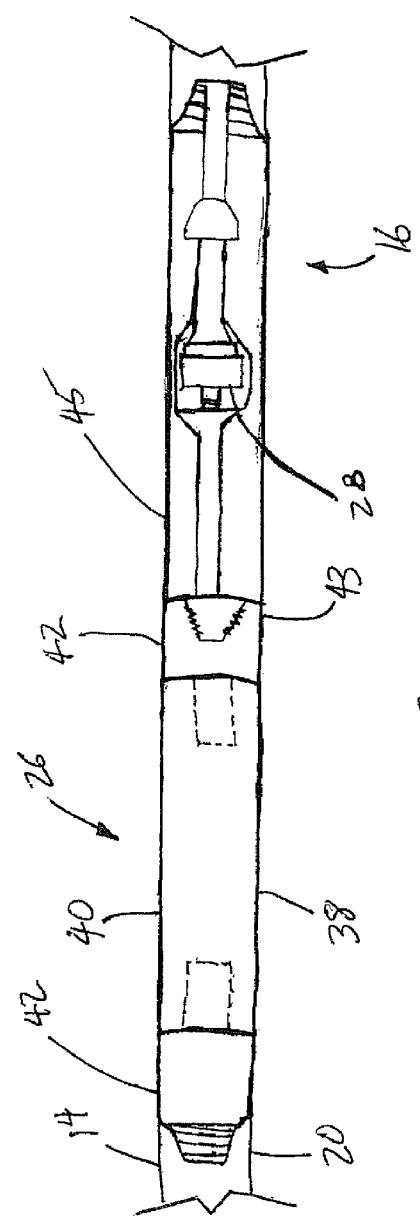
FIG. 2 is a side view of an insulator assembly built in accordance with the present invention.

With reference now to FIG. 2, the insulator assembly 26 may comprise one or more drill pipe sections 38 of insulating construction. A first end 43 of the section 38 is preferable connectable to a housing 45 of the downhole tool assembly 16. Preferably, the transmitter assembly 28 is supported within the housing.

The section 38 preferably comprises a center section 40 made of nonconductive material with metal ends 42 for connecting the insulator assembly 26 to the drill string 14 and the downhole tool assembly 16. More preferably, the center section 40 is comprised of a fiberglass material. The metal ends 42 are preferably connected to the fiberglass center section with an adhesive. More preferably, the adhesive is an aerospace grade high strength adhesive. The insulator assembly 26 is preferably constructed to be of substantially the same outside diameter as the drill string 14. The section 38 may alternatively serve to house the transmitter assembly 28 or other electronics.

Figure 3:
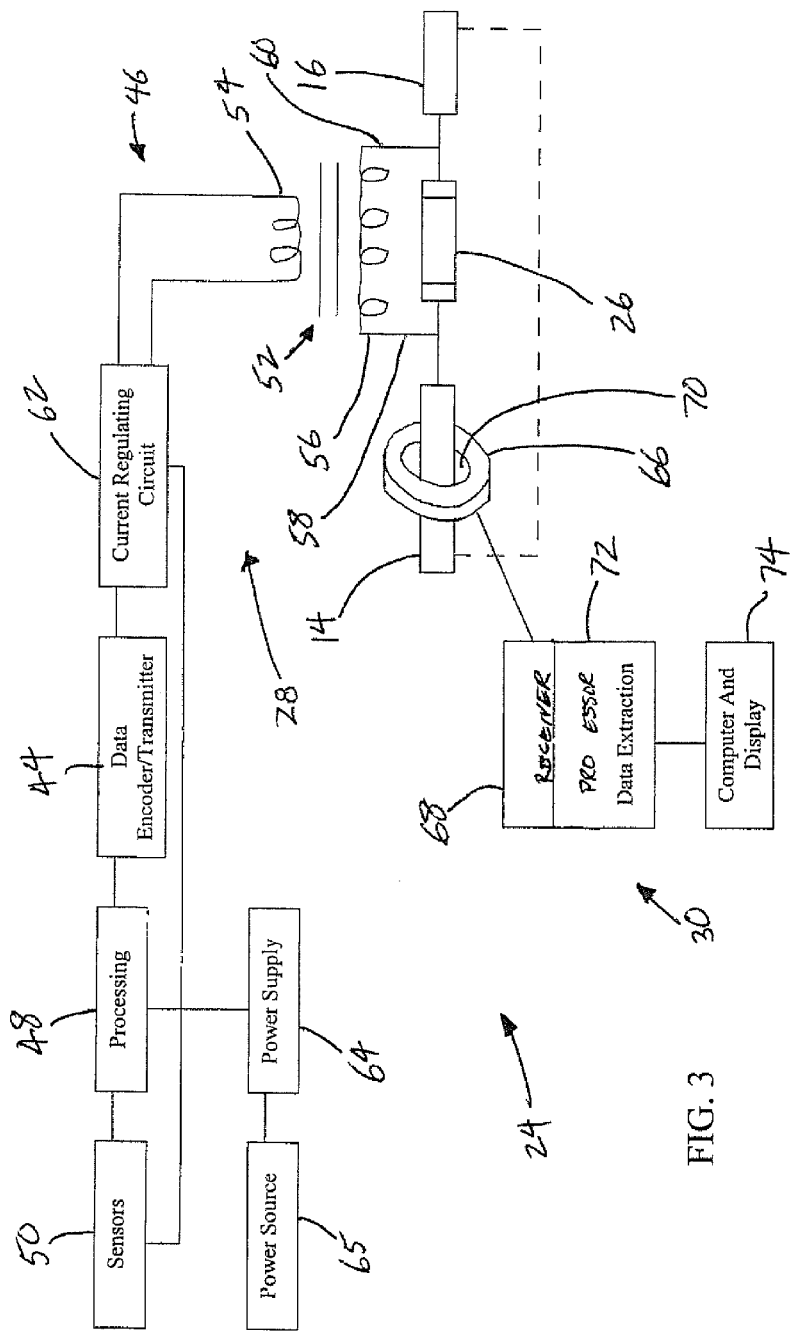
FIG. 3 is a block diagram of the communication system of the present invention.

Referring now to FIG. 3, there is shown therein a block diagram of the communication system 24. The insulator assembly 26 is shown between the drill string communication path of the drill string 14 and the soil engaging electrode of the drill bit 19. As discussed above, the insulator assembly 26 may provide a housing for the transmitter assembly 28. The transmitter assembly 28 preferably comprises a data transmitter assembly 44 and a signal coupler 46.

The data transmitter 44 is adapted to encode and transmit a data signal. The data signal preferably includes information related to the downhole tool assembly 16, the drilling bit 19 and the boring operation. The transmitter 44 may obtain information from a processor 48 which in turn receives data from various sensors 50. The processor 48 is preferably adapted to format the data signal for a variety of communication protocols. For example, bidirectional data communication is possible using RS-232 format; data output via RS-485 format is also available for full compatibility with wireline operations. Data is preferably encoded with a phase-modulated waveform, and more preferably using two cycles of a 180 Hz carrier signal per bit period.

The signal coupler 46 is adapted to provide a controlled electrical connection for the electrical communication. The signal coupler 46 preferably comprises a transformer 52 having a primary winding 54 and a secondary winding 56. More preferably, a first side 58 of the secondary winding 56 is connected to the drill string communication path and a second side 60 of the secondary winding is connected to the soil engaging electrode, drill bit 19, on the downhole tool assembly 16. Preferably, the transformer 52 is a step-up transformer, but may alternatively be a step-down transformer or a unity gain isolation transformer.

The signal coupler 46 further comprises a current regulating circuit 62. The regulating circuit 62 is adapted to adjust a voltage across the primary winding 54 to maintain a substantially constant current amplitude in the primary winding. Preferably, and as yet to be described, the regulating circuit 62 comprises a voltage regulator with an externally available feedback connection. The voltage regulator establishes the voltage amplitude applied to an H-bridge circuit, the legs of which are connected to the primary winding 54 of transformer 52. The low side switches of the H-bridge are not connected directly to a circuit common, but are instead tied together and then connected to circuit common through a shunt resister. The H-bridge current, which circulated through the primary winding 54 of transformer 52, produces a voltage across the shunt resistor which is amplified, filtered, combined with a DC reference voltage, and the resulting composite signal then is applied to feedback connection of the voltage regulator, which completes the essential part of the regulating circuit 62.

One skilled in the art will appreciate alternative arrangements for the transformer 52 and the regulating circuit 62. For example, the transformer 52 may comprise a current-sampling winding and the regulating circuit 62 would be adapted to adjust a voltage across the primary winding to maintain a substantially constant voltage amplitude in the current-sampling winding. Alternatively, the transformer 52 may comprise at least one primary winding and at least one secondary winding, with each of the secondary windings having different winding turns ratio. The transformer 52 could also comprise at least one primary winding and a tapped secondary winding. The current regulating circuit 62 would comprise a switch to select the appropriate tap to maintain a best approximation to the desired constant current.

The preferred embodiment of the transmitter assembly 28 as described has the benefit of addressing several performance issues, including operating efficiency at particularly low operating power, operating from conventional battery power sources, the ability to provide adequate telemetry signal current despite large and unpredictable variations in load impedance, and compatibility with existing beacons and other electronic structures used in HDD systems.

In operation, a preferred telemetry transmitter demonstration board operated with a primary DC source power draw of roughly 230 mA from a 3.0 VDC source, or 690 mW. This measurement is typical of low soil impedance conditions, representing a worst-case situation. This power consumption figure includes all operating losses in power converters and regulators, H-bridge U12, and transformer 52. Operation was demonstrated to 800 feet with 690 mW power consumption using a 180 Hz carrier frequency which is considered an excellent operational result.

As shown in FIG. 3, the transmitter assembly 28 may be operated from a power supply 64. Power supply 64 is preferably supported by battery power. More preferably, battery sources between 2.5 and 3.5 VDC are used. This input operating range includes most common battery arrangements: single cell lithium chemistries, two series-connected alkaline cells, or three NiCd or NiMH cells in series. With minor modifications, the range could be extended beyond 4.0 VDC to permit operation from two series-connected lead-acid gel cells. Test operations have used two series-connected alkaline cells or a laboratory power supply set at 3.0 VDC.

A fundamental problem for any drill string telemetry transmitting apparatus is that of efficiently providing useful signal current to a widely varying load impedance. Preliminary investigations in heavy clay suggest a transmitter drill string signal current of approximately 50 mA would be adequate for most boring applications. Soil impedance is known to be anywhere from a hundred ohms to a thousand ohms. It will be appreciated that a simple fixed voltage drive capable of supplying 50 mA to a thousand ohm load would produce 500 mA in a hundred ohm load. The present invention allows for reliable communication for compaction boring applications, which require no drilling fluid (known as a dry bore). This allows direct signal coupling to both sides of the transmitter's insulating gap 26. Using an efficient transformer 52 connected across an insulating gap 26 between the drill bit 19 and the drill string 14, provides improved ability to drive current into high impedance loads. It is significant that the reflected load of the transformer 52 appears as a resistance, whereas an induction toroid is an inductive load.

Figure 4:
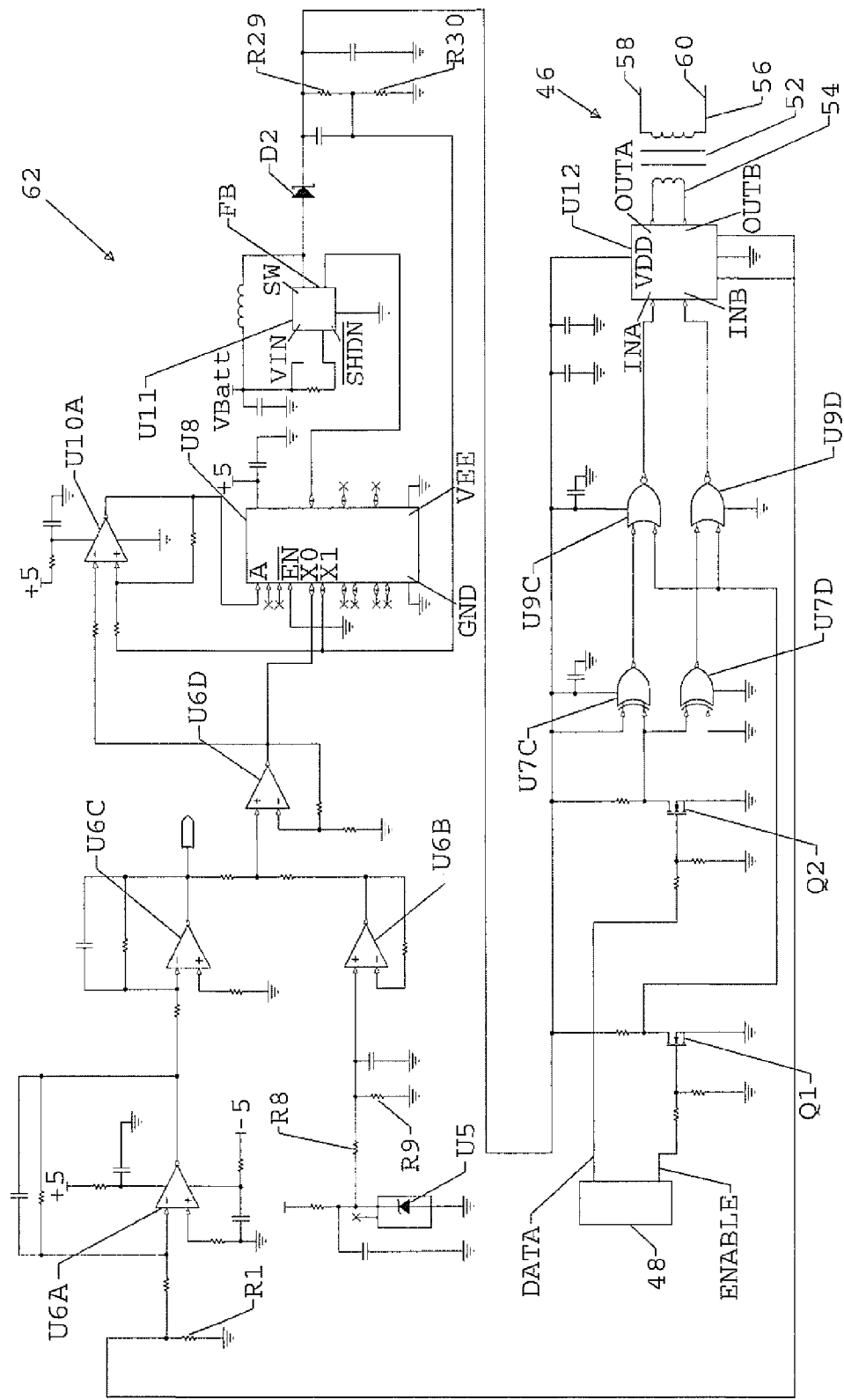
FIG. 4 is a partial schematic of the transmitter assembly of the present invention.

The novel current regulation and supply section driving the transformer 52 has proven beneficial as well. Circuits directly involved with the signal generation are shown in FIG. 4. H-bridge U12 drives the signal transformer 52 primary winding 54. Because all H-bridge U12 current must return to circuit common through the low-side switches, it is convenient to use a small shunt resistor R1 to sense low-side switch current. The resulting shunt voltage is part of a regulator loop modifying operation of switched-mode power converter U11, which supplies operating power to the H-bridge U12.

If load current is too low, voltage at the feedback terminal (FB) of converter U11 is lower than required, causing converter output voltage to increase. This higher voltage is applied to the high side of the H-bridge U12, increasing the transformer's 52 primary voltage, which increases the transformer's secondary voltage, which increases load current until the loop comes into regulation. Likewise, if load current is too high, voltage on the feedback terminal of converter U11 is higher than required, causing regulator output voltage to decrease. This reduces voltage applied to the transformer 52 primary winding 54, which reduces voltage across the transformer 52 secondary winding 56, reducing the drive current.

H-bridge U12 and transformer 52 drive voltage cannot be increased without limit due to device rating limitations. For this reason, a voltage comparator U10A changes state if the current regulator loop 62 attempts to force the power converter's U11 output voltage beyond the desired limit. If the comparator U10A is triggered, multiplexer U8 switches the power converter's U11 feedback connection from the current regulation loop 62 to the converter's normal feedback arrangement. The power converter's U11 normal feedback arrangement is set for the converter's highest allowable output voltage, with the current regulation loop 62 reducing voltage from this maximum value if load impedance is low (a condition, which, if there were no current regulating circuit 62, would cause H-bridge U12 current to be much higher than necessary). In the preferred embodiment, the power converter's U11 output voltage lower limit is actually determined by the feed-forward path through diode D2 in the power converter, which will be a voltage somewhat lower than the battery. Although this feed forward connection may allow signal current to increase beyond the normal set point value for very low soil impedances, actual power dissipation is relatively low because the power converter's output voltage is low.

The preferred transformer 52 provides a 1:2 voltage step-up to the load. Thus, when power converter U11 produces a +12 Volt output, the transformer 52 primary winding 54 drive voltage is +12 Volts and the transformer 52 secondary winding 56 presents a nominal +24 Volt drive to the load. Transistors Q1 and Q2, along with logic elements in U7 and U9, interface to the processor 48. Only two microprocessor lines are required—the first is an ENABLE which is high when the transmitter is to deliver power to the load (see Q1), the second is a serial DATA line (see Q2) which is expanded into complementary H-bridge drive signals by gates U7C and U7D.

The signal current regulator circuit loop 62 is also detailed in FIG. 4. The H-bridge U12 current from the low-side switches passes through R1, a 0.100 ohm shunt resistor. The resulting voltage signal is applied to the input of U6A, a lowpass filter with gain of +20 dBV and cutoff frequency of approximately 100 Hz (the transformer signal frequency of this embodiment is 180 Hz). The lowpass filter output signal is then applied to U6C, which is also a lowpass filter with gain of +20 dB but cutoff frequency of 10 Hz. The result is a +40 dBV second-order lowpass filter with the same phase as the bridge current signal.

The filtered and amplified H-bridge drive signal is applied to U6D, arranged as a non-inverting summing amplifier. The other input to amplifier U6D is derived from reference diode U5, a +2.50 VDC reference diode. The current setpoint is determined by the voltage established by voltage divider resistors R8-R9, buffered by U6B, and applied to the other input of the non-inverting summing amplifier U6D. The summed signal at the output of U6D has two components—one fixed by the divider ratio of R8-R9, the other ultimately dependent on primary winding 54 current delivered by the H-bridge U12. The summing amplifier U6D itself has a gain of unity, or 0 dBV.

When the circuit loop 62 is in regulation, the signal from non-inverting summing amplifier U6D passes through multiplexer U8 and thence to the feedback input pin (FB) of power converter U11. The power converter regulation loop is designated to maintain the feedback pin (FB) at +1.230 V. If, for example, the output of U6D is lower than +1.230 V, the power converter U11 will increase output voltage in response to the low feedback signal. This will increase the voltage on the high-side switches of H-bridge U12, which in turn increases the voltage appearing across the transformer 52 primary winding 54.

Recall that the transformer's 52 load impedance reflects as a resistance. As the transformer's primary 54 voltage increases, the transformer's secondary 56 voltage increases, drive current increases, and the reflected load appears as a higher current on the low-side switches of H-bridge U12. This is the load current sensed by the shunt resistor R1.

Now recall the non-inverting summing amplifier U6D has two signal components. The signal component derived from voltage reference diode U5 is fixed, whereas the component related to H-bridge current is controlled by the power converter's output voltage. The power converter's output voltage climbs until low-side (transformer primary) current reaches the desired value, at which operating point the output of non-inverting summing amplifier U6D reaches +1.230 Volts and the power converter regulator loop is in balance.

If ground impedance is unusually high, the loop 62 will attempt to increase power converter U11 output voltage beyond desirable limits. This condition is detected by Schmitt trigger U10A, which compares the output of non-inverting summing amplifier U6D with the power converter's U11 normal feedback arrangement at R29-R30. R29-R30 are selected to divide the power converter signal and produce +1.230 Volts at the power converter's maximum desired voltage. During normal operation, the power converter U11 output will be lower than the maximum value and the signal at R29-R30 will be less than +1.230 Volts.

If the regulator circuit 62 attempts to drive the power converter U11 voltage beyond the maximum level, Schmitt trigger U10A will change states and connect the power converter's feedback pin to R29-R30 rather than the output of non-inverting summing amplifier U6D. Thus, the power converter loop is forced to limit the power converter's U11 output voltage at a safe value when soil impedance is very high. For lower soil impedances, the power converter loop dynamically adjusts the converter's U11 output voltage to maintain a constant current in the transformer primary 54 until the power converter output voltage falls below the forward path voltage at the cathode of D2, which establishes the minimum possible voltage applied to primary winding 54 in this embodiment.

With reference again to FIG. 3, the receiver assembly 30 of the communication system 24 is located proximate the drilling machine 12. The receiver 30 comprises a toroidal pickup coil 66 and a signal processing assembly 68. The pickup coil 66 is necessarily electrically isolated from the drilling machine 12 to allow for maximum detection of the electrical signal current 32. The pickup coil 66 has an annulus 70 and is positioned such that the drill string 14, and the drill string communication path, passes through the annulus 70. Preferably, the pickup coil 66 uses a ferromagnetic core, but other experimental versions use a Nylon core. The number of turns is typically quite large—the existing pickup coil has 4000 turns—but the number of required turns ultimately depends on the drill string signal current's 32 amplitude and frequency. Use of a 180 Hz carrier, as in this embodiment, typically requires a coil 66 with a large number of turns. The pickup coil 66 is adapted to produce a signal voltage in response to the current 32 on the drill string communication path. Other operating frequencies could be used advantageously.

The induced signal voltage is presented to the signal processing assembly 68. The signal processing assembly 68 comprises a processor 72 and electronics to amplify and filter the induced signal voltage. In the present embodiment, the processor 72 executes an efficient cross correlation phase-tracking demodulation scheme. The processor 72 may then communicate data or information to a display 74.

The telemetry receiver 30 also contains a number of power supply sections to provide operating power from either a +6.25 VDC supply or a +12 VDC supply. Although power consumption is not as significant as it is for a battery-powered telemetry transmitter 28, power consumption has been minimized as a matter of good design practice. The telemetry receiver 30 operates with a primary DC source power draw of roughly 20 mA from a +6.25 VDC source. Demonstrated performance to 800 feet with 125 mW power consumption at a 180 Hz carrier frequency is considered an excellent operational result.

Figure 5:
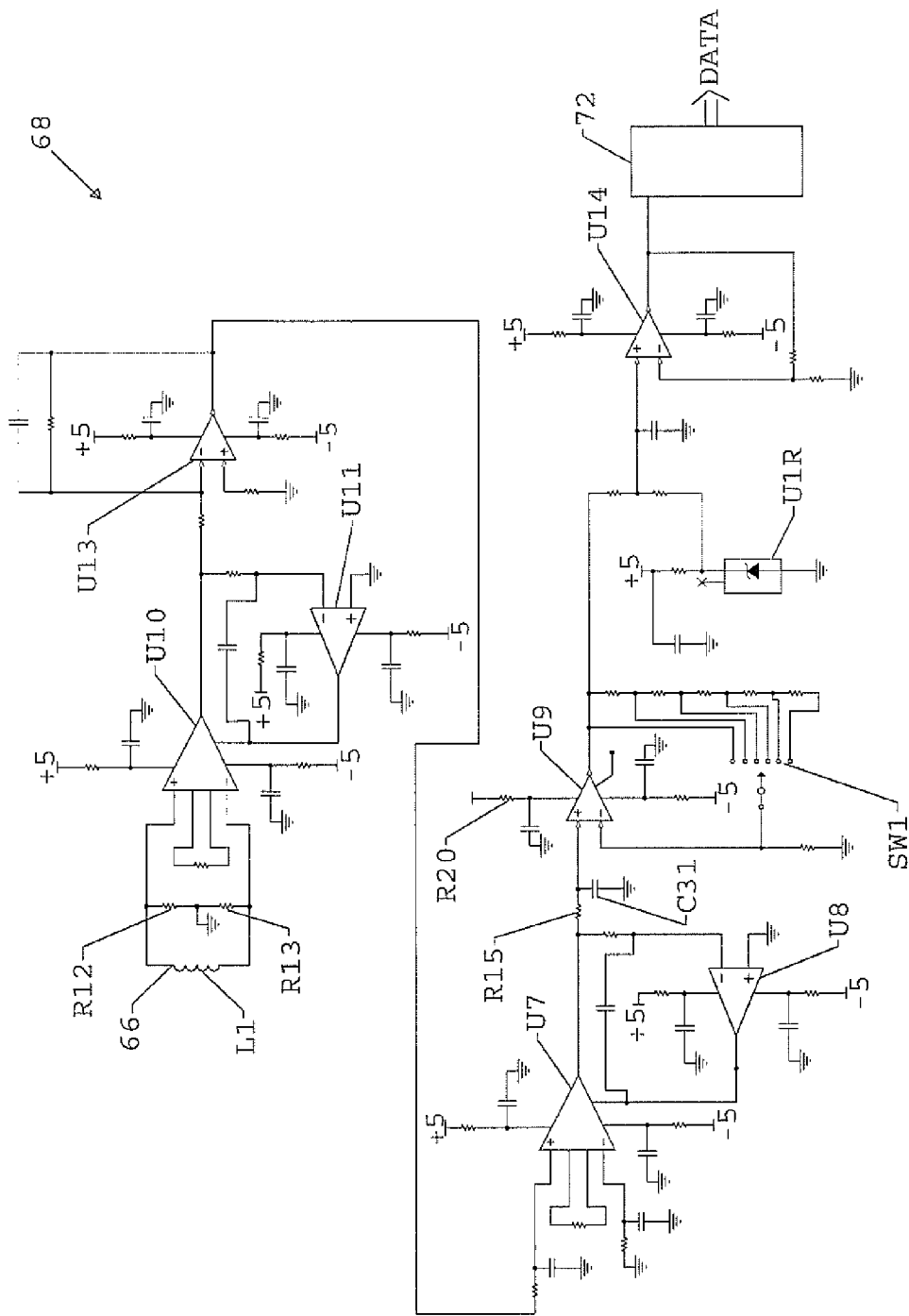
FIG. 5 is a partial schematic of the receiver assembly of the present invention.

The signal processing assembly 68 electronics are shown in FIG. 5. A pickup coil 66 (L1) provides an input signal related to the time derivative of the phase-modulated data signal from the coil. The signal is characteristically a rapidly rising or falling edge with exponentially decaying oscillations. Resistors R12 and R13 dampen the oscillations and provide a return path for an instrumentation amplifier's U10 input bias currents. The instrumentation amplifier U10 provides a gain of +46 dBV to the pickup coil L1 signal while providing very good rejection of common-mode noise signals. Amplifier U11 is part of a compensation loop which lowpass filters DC and low frequency signals and applies these signals to the reference pin of U10, effectively canceling out DC offset and low frequency noise.

The output of initial preamplifier U10 is applied to a lowpass filter U13, having a cutoff frequency of roughly 1.6 Hz. This apparently abnormally low cutoff frequency causes the stage to behave much like an integrator—it captures and holds the essential edge energy of the amplified pickup coil L1 signal while strongly attenuating the characteristically high frequency decaying oscillations of the input waveform. The existing lowpass filter U13 has 0 dBV gain, although it could easily be used to provide additional signal amplification.

The lowpass filtered (integrated) waveform at the output of filter U13 is applied to the input of instrumentation amplifier U7, having a stage gain of +46 dBV. Amplifier U8 provides additional offset and noise compensation identical to that described for amplifier U11. The output of amplifier U7 is applied to a passive lowpass filter (R15, C31) at the input of a non-inverting amplifier U9 providing switch-selectable gains from 0 dBV to +30 dBV in +6 dBV increments. The switch SW1 allows the user to determine a gain setting which provides reliable data communication response without introducing unacceptable signal instability from residual noise. The instant apparatus uses a mechanical switch SW1, but gain selection could easily be placed under software control.

Finally, the amplified signal is applied to a non-inverting summing amplifier U14. The other input of the non-inverting amplifier U14 summing arrangement is provided by a +2.50 volt reference diode. The resulting level-shifting operation converts the bipolar signal from amplifier U9 into a unipolar signal symmetric about +2.50 Volts to fit the microprocessor's A/D converter input window.

The processor 72, shown in FIG. 5, contains an A/D converter which digitizes the waveform at the output from amplifier U14. The processor 72 also performs the correlation sums, selects the appropriate phase tracking delay, and extracts the phase-modulation data. The resultant output data may be presented in either RS-232 or RS-485 format, or any other format needed to satisfy design requirements.

The present invention comprises a communication system 24 for wireless communication, or drill string telemetry, along the drill string. As described in the principal preferred construction presented herein, data transfer is assumed to take place from the subsurface transmitter assembly 28. However, this invention contemplates providing data transfer from a surface transmitter assembly to a subsurface receiver assembly, as for establishing two way communication and the benefit of surface control over subsurface functions.

Various modifications can be made in the design and operation of the present invention without departing from the spirit thereof. Thus, while the principal preferred construction and modes of operation of the invention have been explained in what is now considered to represent its best embodiments, which have been illustrated and described, it should be understood that the invention may be practiced otherwise than as specifically illustrated and described.

What is claimed is:

1. A signal coupler adapted for use with a drill string communication system for communicating information along a drill string defining a drill string communication path between a boring tool and a boring machine, the signal coupler adapted to provide a controlled electrical connection between the drill string communication path and a soil engaging electrode, the signal coupler comprising:
   a transformer having a primary winding and a secondary winding; and
   a current regulating circuit adapted to adjust a voltage across the primary winding to maintain a substantially constant current amplitude in the primary winding;
   wherein a first side of the secondary winding is connected to the drill string communication path and a second side of the secondary winding is connected to the soil engaging electrode.

2. The coupler of claim 1 wherein the transformer comprises a step-up transformer.

3. The coupler of claim 1 wherein the transformer comprises a unity gain isolation transformer.

4. The coupler of claim 1 wherein the transformer further comprises a current-sampling winding and wherein the current regulating circuit is adapted to adjust a voltage across the primary winding to maintain substantially constant current amplitude in the current-sampling winding.

5. The coupling of claim 1 wherein the transformer comprises a step-down transformer.

6. The coupler of claim 1 wherein the transformer comprises at least one primary winding and a plurality of secondary windings, the secondary windings each having different winding turn transfer ratios.

7. The coupler of claim 6 wherein the coupler comprises a switching agent to select one of the plurality of secondary windings.

8. The coupler of claim 1 wherein the transformer comprises a tapped secondary winding.

9. The coupling of claim 8 further comprising a switch to control selection of the tapped secondary winding.

10. A drill string communication system comprising:
a drill string;
a soil engaging electrode;
a signal coupler for providing a controlled electrical connection between the drill string and the soil engaging electrode, the signal coupler comprising:
a primary winding having a substantially constant current amplitude; and
a secondary winding connected to the drill string and the soil engaging electrode;
a data transmitter assembly adapted to encode and transmit a data signal along the drill string; and
a receiver assembly adapted to process and extract the data signal.

11. The system of claim 10 further comprising a current regulating circuit adapted to adjust a voltage across the primary winding to maintain a substantially constant current amplitude in the primary winding.

12. The system of claim 10 wherein the receiver assembly further comprises:
a coil positioned such that the drill string passes proximate the coil, the coil adapted to produce a signal voltage in response to a signal current on the drill string; and
a signal processing assembly adapted to process the signal voltage from the coil.

13. The system of claim 12 wherein the coil is toroidal.

14. The system of claim 10 further comprising an insulator assembly, the insulator assembly defining an electrically insulated gap between the drill string and the soil engaging electrode.

15. A system for data communication in a drilling operation, the system comprising:
an electrically insulated drill string;
a transmitter assembly supported at a downhole end of drill string and adapted to transmit a signal current comprising an encoded data signal along the drill string based upon a controlled electrical connection between the drill string and a soil-engaging electrode; and
a receiver assembly positioned proximate an uphole end of drill string to detect the signal current and extract the data signal.

16. The system of claim 15 comprising an insulator assembly, the insulator assembly defining an electrically insulated gap between the drill string and the soil engaging electrode.

17. The system of claim 15 wherein the receiver assembly comprises a pickup coil positioned such that the drill string passes proximate the pickup coil, the pickup coil adapted to produce a signal voltage in response to a signal current on the drill string.

18. The system of claim 17 wherein the receiver assembly comprises a signal processing assembly adapted to process the signal voltage from the pickup coil and to extract the data signal.

19. The system of claim 17 wherein the pickup coil defines an annulus such that the drill string communication path passes through the annulus.

20. The system of claim 19 wherein the pickup coil is toroidal.

21. The system of claim 20 wherein the drill string communication system further comprises an insulator assembly defining an electrically insulated gap between the drill string communication path and the soil engaging electrode.

22. A method for communicating information along a drill string, the method comprising:
insulating a first end of a drill string from a second end of the drill string;
generating an electromagnetic data signal;
generating a current on the drill string using a transformer having at least one primary winding and at least one secondary winding;
adjusting a voltage across the primary winding to maintain a substantially constant current amplitude in the primary winding; and
sensing the current on the first end of the drill string using a receiver positioned proximate the first end of the drill string; and
extracting the data signal at the second end of the drill string.

23. The method of claim 22 further comprising the steps of:
connecting a first side of the secondary winding to the first end of the drill string; and
connecting a second side of the secondary winding to the second end of the drill string.

24. The method of claim 22 wherein the receiver comprises a coil.

25. The method of claim 24 wherein the coil is a toroid.

26. A drill string communication system for communicating information along a drill string between a boring tool and a boring machine, the system comprising:
an insulator assembly defining an electrically insulated gap between a drill string communication path and a soil engaging electrode;
a transmitter assembly comprising:
a data transmitter assembly adapted to encode and transmit a data signal; and;
a signal coupler comprising a transformer to maintain a substantially constant current amplitude;
wherein the transformer is connected to the drill string communication path and the soil engaging electrode; and
a receiver assembly comprising:
a pickup coil having an annulus and positioned such that the drill string communication path passes through the annulus, the pickup coil adapted to produce a signal voltage in response to a signal current on the drill string communication path; and
a signal processing assembly adapted to process the signal voltage from the toroidal pickup coil and to extract the data signal.

* * * * *